United States Patent Office 3,417,360
Patented Dec. 17, 1968

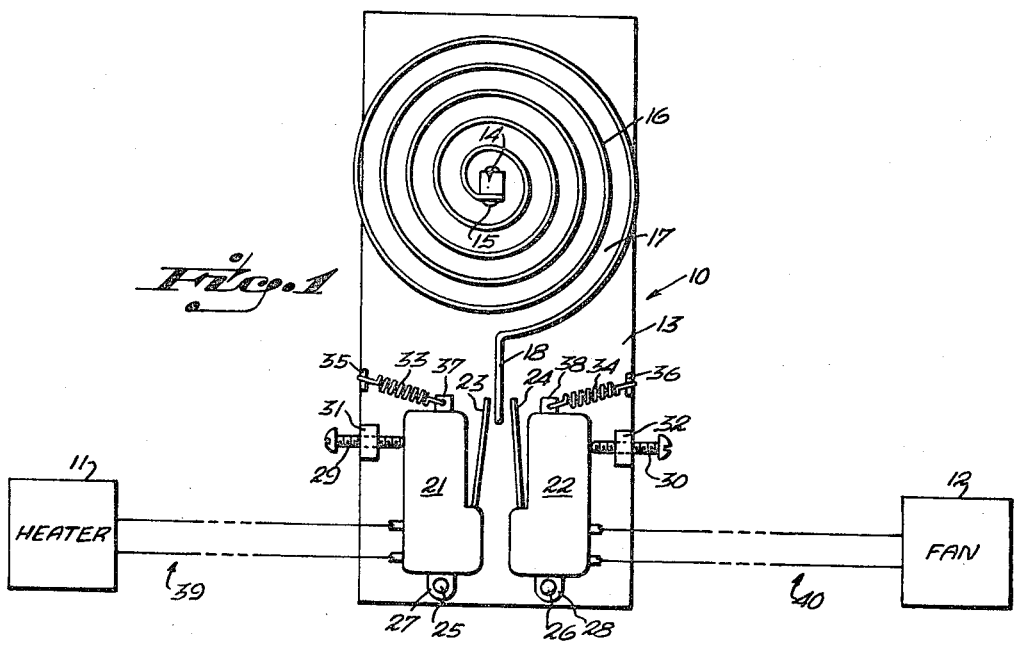
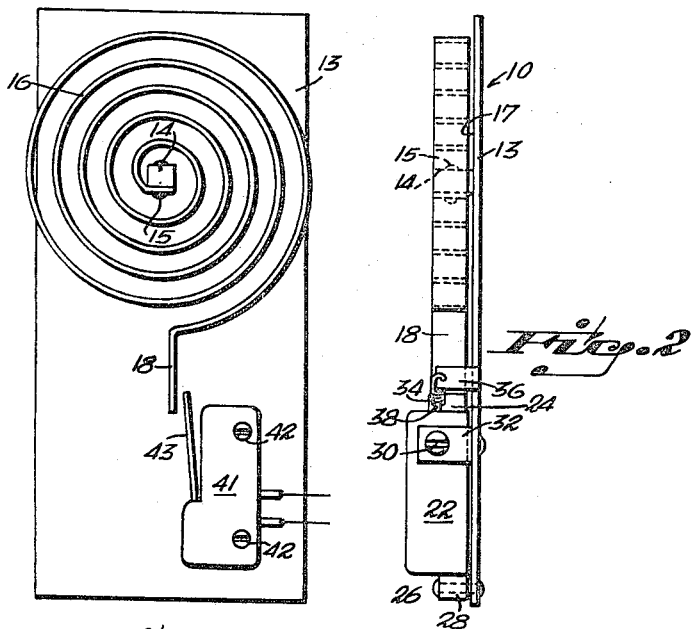

3,417,360
THERMOSTATIC CONTROL FOR HEATING
AND COOLING
Lee G. Eggers, 3907 Liberty Ave.,
Sarasota, Fla. 33581
Filed Jan. 31, 1967, Ser. No. 612,915
1 Claim. (Cl. 337—339)

ABSTRACT OF THE DISCLOSURE

A thermostat for alternately switching on and off a pair of electric switches controlling the energization of heating and cooling devices in response to temperature change in order to maintain substantially constant room temperature. A helically-coiled bi-metallic member has one end fixed and its other end, in its movement in response to temperature change, actuates one or the other of the switches depending upon the direction of temperature change. Positional adjustment of the electric switches with respect to the free end of the bi-metallic element allows for independent control of the temperature range of operation of the device.

My invention relates, generally, to thermostatic controls, and is directed particularly to an improved thermostat for independently controlling heating and cooling devices in response to changes in temperature.

The principal object of this invention is to provide a thermostat of the character described which is particularly well suited for use in conjunction with an electric fan and an electric heater for independently and selectively controlling their operation in response to small changes in temperature for automatically maintaining room temperature at comfortable levels.

A more particular object is to provide a thermostatic control device of the character described comprising a bi-metallic element in the form of a flat spiral and serving as a thermally responsive element, one end of which in its movement in response to temperature change actuates, selectively depending upon the direction of temperature change, one or the other of a pair of electrical switches connected to independently control, correspondingly, a heater for heating or a fan for cooling an area to be temperature controlled.

Still another object is to provide a thermostatic control device of the character described which will be readily adjustable as to temperature range of operation.

Yet another object is to provide a thermostatic control device of the above nature which will be comparatively simple in structure and operation, economical in cost, and dependable, efficient and long wearing in operation.

Other objects, features and advantages of the invention will be apparent from the following description when read with reference to the accompanying drawings. In the drawings, wherein like reference numerals denote corresponding parts throughout the several views:

FIG. 1 is a front elevational view of a thermostatic control device embodying the invention, shown connected to a fan and heater to be controlled, the fan and heater being illustrated in block form for simplicity, FIG. 2 is a side elevational view of the thermostatic control device shown separately, and FIG. 3 is a modified and simplified form of the invention for controlling the operation of a single air conditioning device such as a fan.

Referring now in detail to the drawing, 10 designates a thermostatic control device embodying the invention, shown in FIG. 1 connected for the control of a heater 11 and a fan 12 in the room to be temperature controlled, as is hereinbelow more particularly described. The control device 10 comprises a rigid rectangular base member 13, of metal or a stiff synthetic plastic material, for example. The base member 13 is provided near its upper end with a centrally-arranged forwardly-extending lug or post 14 secured to which, as by a rivet 15, is the central end of a bi-metallic element 16 in the form of a flat spiral. The bi-metallic element 16, as illustrated in FIG. 2, is arranged in slightly spaced, parallel relation with respect to the front wall 17 of the base member 13, and has its outer end bent downwardly to provide an integral actuating arm portion 18. A pair of single-pole, single-throw micro-switches 21, 22 are arranged at the lower end of the base member 13, one at each side thereof, with their switch control levers 23, 24, respectively, extending in spaced relation to opposed sides of the lower end of the actuating arm 18. The micro-switches 21, 22 are swingably mounted with respect to the base member 13 by means of posts 25, 26 fixed to said base member and extending through apertured lugs 27, 28 formed at the lower ends of said micro-switches, respectively.

Means is provided for adjustably controlling the spacing between the lower end of the bi-metallic element actuating arm 18 and the upper ends of the micro-switch control levers 23, 24 for correspondingly controlling temperature range of operation of the device. To this end, adjustment screws 29, 30, threadable in upstanding lugs 31, 32 at each side of the base member 13 and bearing at their inner ends against outer side portions, respectively, of the micro-switches 21, 22 near the upper ends thereof, serve to swingably move said micro-switches in or out with respect to the lower end of the bi-metallic element actuating arm 18. Helical tension springs, 33, 34 acting between attachment lugs 35, 36, extending outwardly at each side of the base member 13, and attachment lugs 37, 38, extending outwardly of the upper ends of the micro-switches 21, 22, serve to yieldably constrain said micro-switches in their outermost positions of rotation about their respective posts 25, 26 in abutment with the inner ends of the adjustment screws 29, 30.

In use, the control device 10 will be mounted at an appropriate height and location for sensing the temperature of the room to be controlled with respect to heating and fan cooling, and the switch terminals of the micro-switches 21, 22 connected, through cables 39, 40, to the energizing circuits for the heater 11 and fan 12 for switching them on, respectively, upon actuation of the corresponding micro-switch. The bi-metallic element 16, which is of known construction comprising, along its length, inner and outer layers of metal differing in their coefficient of expansion characteristic, will unwind slightly upon increase in temperature, and become slightly more tightly wound upon decrease in temperature with respect to desired room temperature represented by the straight down position of the actuating arm 18 as illustrated in FIG. 1. Since the inner end of the bi-metallic element 16 is fixed, unwinding upon increase in room temperature from normal will move the actuating arm 18 at the free end of said element to the right as seen in FIG. 1, whereupon it will actuate the control lever 24 associated with the micro-switch 22 to close its normally-open electrical switch, to energize the fan 11 for air circulation and cooling in the room. Conversely, if room temperature falls from normal, the actuating arm 18 will move to the left, as illustrated in FIG. 1, to actuate the micro-switch 21 and thereby energize the heater 12 to raise room temperature to normal or desired temperature again. It will be noted that in and out movement of the adjustment screws 29, 30 adjusts the side-to-side distances between the outer ends of the switch control levers 23, 24, and the actuating arm 18, thereby controlling, within a wide range of temperature settings, the high and low temperatures at which the heater and fan, respectively, will become operative.

FIG. 3 illustrates a modified form of the invention for use in controlling cooling only in response to an increase in room temperature. It differs from the embodiment illustrated in FIGS. 1 and 2 described above only in that a single micro-switch 41 is utilized in association with a bi-metallic element 16, and in that said micro-switch is fixed wth respect to the base member 13 instead of being adjustable. Operation is the same as for the embodiment of FIGS. 1 and 2 described above, it being understood that only a heating or cooling device will be controlled, depending upon which side of the actuating arm the micro-switch 41 is placed.

While I have illustrated and described herein only two forms in which my invention can conveniently be embodied in practice, it is to be understood that these forms are presented by way of example only, and not in a limiting sense. The invention in brief, comprises all the modifications and embodiments coming within the scope and spirit of the following claims.

What I claim as new and desire to secure by Letters Patent is:

1. In a temperature control device, the combination comprising, a base member, a bi-metallic element in the form of a flat spiral arranged in spaced, parallel relation with respect to said base member, the inner end of said bi-metallic element being fixed with respect to said base member, the outer end of said bi-metallic element terminating in a substantially radially-outwardly extending actuating arm, a micro-switch secured to said base member and having a switch control lever an end portion of which is normally disposed in spaced, substantially parallel relation with respect to one side of an outer end portion of said actuating arm for abutment by said actuating arm in response to a change in temperature affecting said bi-metallic element, means for adjustably positioning said micro-switch with respect to said actuating arm for controlling said normal spacing between sad control lever and said actuating arm, said adjustably positioning means comprising mechanism swingably mounting one end of said micro-switch with respect to said base member, a spring acting between the other end of said micro-switch and said base member and operative to resiliently urge said microswitch in the direction away from said actuating arm, adjustable screw means supported by said base member abutting said other end of said micro-switch and positioned to oppose the urging of said spring, and a second micro-switch the same in structure and arrangement as said first mentioned micro-switch but disposed in opposition with respect thereto at the other side of said outer end portion of said actuating arm.

References Cited

UNITED STATES PATENTS

| | | | |
|---|---|---|---|
| 2,262,341 | 11/1941 | Shaw | 200—122 |
| 2,711,450 | 6/1955 | Carr | 200—166 |
| 2,898,428 | 8/1959 | Holden | 200—153 |
| 3,052,788 | 9/1962 | Peters | 200—153 |

BERNARD A. GILHEANY, *Primary Examiner.*

R. COHRS, *Assistant Examiner.*

U.S. Cl. X.R.

337—360, 368